(12) United States Patent
Henzler et al.

(10) Patent No.: US 11,253,930 B2
(45) Date of Patent: Feb. 22, 2022

(54) TOOL SYSTEM

(71) Applicant: CeramTec GmbH, Plochingen (DE)

(72) Inventors: Uwe Henzler, Hochdorf (DE); Michael Nitsche, Ebersbach (DE)

(73) Assignee: CERAMTEC GMBH, Plochingen (DE)

( * ) Notice: Subject to any disclaimer, the term of this patent is extended or adjusted under 35 U.S.C. 154(b) by 268 days.

(21) Appl. No.: 16/423,630

(22) Filed: May 28, 2019

(65) Prior Publication Data

US 2019/0366444 A1  Dec. 5, 2019

(30) Foreign Application Priority Data

May 29, 2018 (EP) .................................... 18174788

(51) Int. Cl.
| | |
|---|---|
| B23B 27/04 | (2006.01) |
| B23B 27/10 | (2006.01) |
| B23B 27/16 | (2006.01) |
| B23B 27/08 | (2006.01) |

(52) U.S. Cl.
CPC .......... *B23B 27/1622* (2013.01); *B23B 27/04* (2013.01); *B23B 27/08* (2013.01); *B23B 27/10* (2013.01); *B23B 2250/12* (2013.01); *B23B 2260/126* (2013.01)

(58) Field of Classification Search
CPC ......... B23B 27/10; B23B 27/04; B23B 27/08; B23B 27/16; B23B 27/1622; B23B 27/1677; B23B 27/1625; B23B 25/02; B23B 29/043; B23B 29/04; B23B 2205/02; B23B 2205/12; B23B 2200/08; B23B 2250/12; B23B 2260/03; B23B 2260/126
See application file for complete search history.

(56) References Cited

U.S. PATENT DOCUMENTS

| | | | | |
|---|---|---|---|---|
| 3,795,454 A | * | 3/1974 | Elchyshyn | B23Q 11/10 408/197 |
| 4,848,198 A | * | 7/1989 | Royal | B23B 25/02 82/1.11 |
| 4,955,264 A | * | 9/1990 | Armbrust | B23B 25/02 407/11 |

(Continued)

FOREIGN PATENT DOCUMENTS

| | | |
|---|---|---|
| DE | 102016200195 A1 | 7/2016 |
| EP | 1841555 A1 | 10/2007 |

(Continued)

OTHER PUBLICATIONS

European Search Report for EP 18 174 788.2 dated Nov. 27, 2018 (9 pages).

*Primary Examiner* — Nicole N Ramos
(74) *Attorney, Agent, or Firm* — Fitch Even Tabin & Flannery, LLP

(57) ABSTRACT

Tool system 1 comprising a tool holder 2 that has an insert seat 17 for receiving a cutting insert 6, and comprising a clamping element 4 that has an opening 26 for receiving a clamping means 15, an interface 30 being arranged between the tool holder 2 and the clamping element 4, and channels for the purpose of cooling by means of a fluid being arranged in the tool holder 2 and the clamping element 4, and a sealing means 31 being arranged in the region of the interface 30.

17 Claims, 5 Drawing Sheets

(56) References Cited

U.S. PATENT DOCUMENTS

| | | | |
|---|---|---|---|
| 5,340,242 A * | 8/1994 | Armbrust | B23B 25/02 407/11 |
| 5,718,156 A * | 2/1998 | Lagrolet | B23B 27/10 407/11 |
| 6,602,031 B2 * | 8/2003 | Hara | B23Q 11/1015 409/131 |
| 6,652,200 B2 * | 11/2003 | Kraemer | B23B 27/10 407/104 |
| 7,320,563 B2 * | 1/2008 | Muller | B23B 27/164 407/102 |
| 7,712,492 B2 * | 5/2010 | Hu | B27G 13/04 144/117.1 |
| 8,388,273 B2 * | 3/2013 | Eder | B23B 27/1625 407/107 |
| 8,826,786 B2 * | 9/2014 | Amstibovitsky | B23Q 11/1023 83/22 |
| 9,873,154 B2 | 1/2018 | Baker et al. | |
| 2003/0086766 A1 * | 5/2003 | Andras | B23B 27/16 407/102 |
| 2006/0140728 A1 | 6/2006 | Giannetti | |
| 2007/0283794 A1 | 12/2007 | Giannetti | |
| 2010/0183385 A1 * | 7/2010 | Conway | B23B 27/1677 407/107 |
| 2011/0070037 A1 * | 3/2011 | Baker | B23B 27/10 407/11 |
| 2014/0133924 A1 * | 5/2014 | Oren | B23B 27/10 407/11 |
| 2019/0001419 A1 | 1/2019 | Henzler | |

FOREIGN PATENT DOCUMENTS

| | | |
|---|---|---|
| EP | 3219421 A1 | 9/2017 |
| JP | H07-227702 A | 8/1995 |
| WO | 2014076689 A1 | 5/2014 |
| WO | 2017/003343 A1 | 1/2017 |

* cited by examiner

TOOL SYSTEM

CROSS-REFERENCE TO RELATED APPLICATION

This application claims priority from European Patent Application No. Ep 18 174 788.2, filed May 29, 2018, which is hereby incorporated herein by reference in its entirety for all purposes.

TECHNICAL FIELD

The invention relates to a tool system comprising a tool holder that has an insert seat for receiving a cutting insert, and a stop face remote from said insert seat, and comprising a clamping element that has an opening for receiving a clamping means, and a stop face, the two stop faces forming an interface between the tool holder and the clamping element, the tool holder and the clamping element comprising a least one fluid channel for the purpose of cooling, and an element for connecting the fluid channels in a pressure-tight manner being arranged in the region of the interface between the tool holder and the clamping element.

BACKGROUND

Process-optimized machining of difficult-to-cut (DTC) materials, such as nickel-based alloys, known as superalloys, and titanium alloys, referred to in the following as ISO S materials or DTC materials, which are used mainly in the field of aerospace and energy generation, requires the region of the machining to be cooled by means of a medium. In this case, it is possible to influence the creation of the chips and the deflection thereof by means of the fluids, which arrive at their destination under high pressure. Purposeful cooling in the shear zone of the chip generation, in the range of from 800 to 1100°, can increase the lifetime of the cutting material or the cutting insert while simultaneously increasing the machining parameters.

The prior art includes various disclosures of cooling channels by means of which coolant is supplied to the machining region.

For example, U.S. Pat. No. 9,873,154 discloses a cutting tool comprising a main body for receiving a cutting insert, and a clamp for clamping the cutting insert to the main tool, the clamp and the main body comprising fluid channels. A seal is arranged between the clamp and the main body of the cutting tool. In the case of a worn-out cutting insert, the seal also has to be changed when said insert is replaced. Only in this manner can the sealing tightness of the cutting tool be ensured.

WO 2014/076689 discloses a tool holder comprising a main body and a clamp that clamps a cutting insert to the main body, the main body and the clamp comprising a coolant channel. A coolant plug that connects the coolant channel in the main body to the coolant channel in the clamp is arranged between the main body and the clamp. In this case, the coolant plug consists of a compressible material, such as a polymer, polyurethane elastomer or the like, such that said plug can be compressed when the cutting insert is clamped.

SUMMARY

Proceeding from the prior art, the object of the invention is that of improving a tool system, such that the process parameters can be optimized and thus the production costs reduced, while maintaining or improving the quality.

Process-optimized machining of difficult-to-cut (DTC) materials, such as nickel-based alloys, known as superalloys, and titanium alloys, referred to in the following as ISO S materials or DTC materials, which are used mainly in the field of aerospace and energy generation, requires the region of the machining to be cooled by means of a medium. In this case, it is possible to influence the creation of the chips and the deflection thereof by means of the fluids, which arrive at their destination under a high pressure of up to 120 bar. Purposeful cooling in the shear zone of the chip generation, in the range of from 800 to 1100°, can increase the lifetime of the cutting material or the cutting insert while simultaneously increasing the machining parameters. The higher the cooling quality in the region of the shear zone of the chip generation, the higher the process parameters, such as the feed rate and the depth of cut, can be set. The production costs can be reduced thereby.

The invention relates to a tool system for machining workpieces, comprising a tool holder having a clamping element that has a clamping element nose, and having a cutting insert, it being possible for the cutting insert to comprise a depression on the upper face of the cutting insert. If the cutting insert comprises a depression, said depression preferably contains a depression base that transitions into the upper face of the cutting insert, via an annular surface. In a specific embodiment, a ridge may be arranged in the depression, the tip of which ridge ends so as to be spaced apart from the cutting insert surface. In the clamped state, a nose or an attachment, arranged at the first end of a clamping element, engages in the depression of the cutting insert and thereby clamps said insert to the tool holder, i.e. the main body of the tool system. The nose may comprise an annular surface that is congruent to the annular surface of the depression. The nose may also be arranged on a pressure plate arranged on the clamping element. In the clamped state of the tool system, a clamping means introduces a force into the depression of the cutting insert, via the clamping element and the annular surface of the nose. The force is introduced into the annular surface of the depression of the cutting insert around the annular surface of the nose of the clamping element. The force applied to the entire annular surface (360°) allows for the cutting insert to be fastened in the tool system in a secure and accurately positioned manner.

The arrangement of the annular surface in the depression of the cutting insert and the annular surface on the nose of the clamping element, as well as of the stop faces on the clamping element and on the tool holder, allows for an extensive contact region between the nose of the clamping element and the depression of the cutting insert when clamping the cutting insert. Said contact region extends completely over the entirety of the annular surfaces, such that force is applied to the cutting insert in a region of 360 degrees, and said cutting insert is retained in the insert seat in an accurately positioned and secure manner.

In a preferred application, a cutting insert comprising a planar surface, without a depression, can be used. In this case, the clamping element comprises a planar clamping surface arranged opposite the surface of the cutting insert. Said clamping surface may also be arranged on a pressure plate. The pressure plate may be movably arranged on the clamping element, between the clamping element and the cutting insert. As a result, when clamping the cutting insert the tolerances that result during production of the tool system can be compensated, and secure clamping of the cutting insert such that the smooth surface thereof is in the tool holder can be ensured.

The clamping mechanism for clamping the cutting insert comprises a clamping means that is arranged outside of the center of the clamping element. During the clamping process, a contact surface, for example a slide surface, arranged on a second end of the clamping element is in operative connection with a contact surface arranged on the tool holder. The contact surface of the clamping element and the contact surface of the tool holder form the interface between the clamping element and the tool holder.

In an embodiment of the tool system according to the invention, the interface is arranged so as to be at an angle to the upper face of the tool holder or the flat face of the clamping element. In this case, the contact surfaces are arranged so as to be at an angle to the clamping direction of the clamping element. As a result, during the clamping process the clamping element moves relative to the tool holder that is arranged in the tool system in a fixed position, and clamps the cutting insert in the insert seat of the tool holder in a repeatable and accurately positioned manner. The relative movement of the clamping element with respect to the tool holder has a movement component that is transverse to the clamping direction. In other words, during the clamping process, the clamping element moves towards the cutting insert (towards the tool holder) in order to allow for secure clamping of the cutting insert, and at the same time the clamping element moves transversely to the clamping direction in order to position the cutting insert exactly in the insert seat.

The clamping element and the tool holder each comprise at least one channel provided for transporting fluid media as a coolant. The features of one fluid channel disclosed in the following also apply for a plurality of channels, if this is present. The dimensions (cross section, diameter, etc.) of a fluid channel can be adjusted to the fluid media. As a result, a cylindrical cross section of the channel, for example in the form of a bore, or a cross section that deviates from a cylindrical shape, for example an elliptical cross section, are possible. The clamping element and the tool holder may each comprise one or more fluid channels. The fluid channels may be arranged at any desired angles relative to the longitudinal axis of the tool system. The fluid channels end in the region of the cutting insert or of the insert seat.

It is thus possible, for example, for the fluid channel in the tool holder to end in the region of the insert seat in which the cutting insert is arranged. In this embodiment, the fluid channel may end below the cutting insert, in the front region of the cutting insert, in the direction of the workpiece that is to be machined. In this case, the tool holder may protrude slightly beyond the cutting insert, in the direction of the workpiece.

The fluid channel in the clamping element may end above the cutting insert, in the first end region of the clamping element. This makes it possible to purposefully guide the fluid supply to the shear zone of the chip generation. For this purpose, the fluid channel in the clamping element and in the tool holder may be arranged transversely, i.e. so as to be at an angle to the longitudinal axis of the tool system.

The fluids may be in a liquid or in a gaseous state.

The interface between the clamping element and the tool holder is located in the region of the second end of the clamping element in which the contact surface of the clamping element cooperates with the contact surface of the tool holder of the tool system. The channel in the clamping element begins at said interface, at the contact surface, and ends in the region of the first end of the clamping element. The outlet of the channel is arranged such that the fluid which flows through the channel and emerges at the outlet can be purposefully guided to the location to be cooled. Said location may relate both to the region of the shear zone during chip generation, and/or to a region of the cutting insert. In order to purposefully orient the fluid jet, the outlet of the fluid channel may be arranged so as to be at an angle to the upper face of the clamping element. The outlet of the channel may be of the same shape as the channel inside the clamping element. The shape of the outlet may also deviate from the shape or design of the shape of the channel. The outlet may comprise a plurality of exits that are arranged side-by-side or one above the other. One fluid channel may transition into a plurality of exits in the region of the outlet. In order that the fluid jet can be purposefully directed towards the shear zone of the chip generation, the outlet of the fluid channel may also comprise a nozzle, for example. A correspondingly arranged nozzle allows for both the shape and the direction of the fluid jet to be changed. The nozzle may be movably mounted.

The channel in the tool holder of the tool system extends from a connection point, to which the fluid supply is coupled, as far as the interface, i.e. the contact surface of the tool holder. The fluid supply at the connection point is achieved by means of couplings that are known per se. The fluid channel may divide in the tool holder, such that a first portion of the channel leads to the interface and a second portion of the channel leads into the region of the insert seat. The outlet of the channel in the region of the insert seat is arranged and designed such that optimal cooling of the cutting insert and/or of the shear point of the chip generation is possible. The outlet of the channel in the region of the insert seat may be of the same shape as the channel inside the main body. The outlet may comprise a plurality of exits that are arranged side-by-side or one above the other. One fluid channel may transition into a plurality of exits in the region of the outlet. In order that the fluid jet can be purposefully directed towards the shear zone of the chip generation, the outlet of the fluid jet may comprise a nozzle. A corresponding nozzle allows for both the shape and the direction of the fluid jet to be changed. The nozzle may be movably mounted. It is also possible for the tool holder of the tool system to comprise a projection in the region of the insert seat and to thus extend beyond the insert seat, in the direction of the workpiece to be machined. The outlet of the channel may be arranged in said projection. A cutting insert positioned in the insert seat may end before said projection. In this embodiment, it is necessary for the tool system to be arranged so as to be inclined at an angle with respect to the workpiece during use. The angle is selected such that the spacing between the cutting edge of the cutting insert and the workpiece is smaller than the spacing between the projection and the workpiece. Nonetheless, the cutting insert can be cooled by means of the fluid jet that emerges in the projection in front of the cutting insert. The fluid jet can be purposefully directed to the destination thereof, for example the cutting insert or the shear point of the chip generation.

In order to form a transition of the channel from the main body into the channel of the clamping element so as to be sealed at the interface, according to the invention an element, a sealing element, also referred to in the claims as a sealing means, is provided. The sealing element may be designed in the form of a cylindrical element comprising a surface. In this case, the sealing element corresponds to a cylindrical body that is flattened in the longitudinal direction. The sealing element comprises at least one opening which connects the channel of the tool holder to the channel of the clamping element. The shape of the opening preferably corresponds to the shape of the channels, at least in the region of the interface. The opening extends through the sealing element, from the lateral surface as far as the flat face. In addition, the sealing element may comprise a recess in the form of a slot. A fastening element, by means of which the sealing element and the clamping element are locked in the transverse direction, is inserted into said recess. The transverse direction is intended to be understood to be a direction that is at an angle to the longitudinal axis of the tool holder or of the clamping element.

The fastening element comprises a fastening portion, for example in the form of an external thread, at a first end thereof, and is fastened in the tool holder in a receiving region, for example in an internal thread, in an interlocking manner. Other fastening methods that are known per se, for example a press fit, are also possible. The fastening element comprises a guide portion immediately adjoining the fastening portion. The guide portion cooperates with the recess, i.e. the slot, of the sealing element. When the sealing element is installed in the tool holder, the sealing element is thus captively arranged. The sealing element is movably mounted and can rotate about the longitudinal axis thereof. In addition, said element is captively arranged in the axial direction, in the direction of the longitudinal axis thereof.

The guide portion of the fastening element protrudes beyond the sealing element and engages in a groove in the clamping element. As a result, the clamping element can be locked in the transverse direction. The width or breadth of the groove in the clamping element is adjusted, in this region, to the diameter or to the breadth of the guide portion of the fastening means, such that the guide portion can engage in the groove. For this purpose, the fastening element protrudes beyond the stop face of the tool holder and beyond the flat face of the sealing element.

The recess in the sealing element, in which the fastening element engages, is designed such that movable arrangement in the radial direction, about the longitudinal axis, of the sealing element is possible. The sealing element is captively arranged in the axial direction, which corresponds to the transverse direction described above.

In an alternative embodiment according to the invention, the captive arrangement of the sealing element in the transverse direction is ensured by a fastening means in the form of a resilient pressure piece that is known per se. For this purpose, the sealing element comprises a recess, in the form of a furrow, on the periphery thereof, in which furrow the ball of the fastening means engages in the mounted state. This ensures the mobility of the sealing element about the longitudinal axis thereof, and in addition the sealing element is captively retained in the transverse direction. The interlocking, movable arrangement of the sealing element, at the outer periphery thereof, by means of the ball of the resilient pressure piece is preferably used when the sealing element has a small extension in the longitudinal direction and there is therefore not sufficient space available, next to the opening for connecting the line portions, to provide a recess that can receive a fastening means. According to this embodiment, the locking of the clamping element in the transverse direction is then achieved independently of the fastening means. For this purpose, the clamping element may comprise a groove in which for example a fastening means in the form of a pin-shaped locking means, which is arranged in the tool holder in a fixed position, engages.

The receiving region of the sealing element in the tool holder of the tool system is designed in accordance with the external shape of the sealing element. If the to sealing element is substantially cylindrical in shape, then said receiving region in the tool holder corresponds to a cylindrical bore or a portion of a cylindrical bore. This ensures the rotational mobility of the sealing element.

In a specific embodiment of a tool system according to the invention, the sealing element may also be arranged in or on the clamping element. In this case, the receiving region of the sealing element is arranged in the clamping element and corresponds to the external shape of the sealing element.

When the clamping element clamps a cutting insert, the sealing element interlockingly adapts to both the clamping element and the tool holder, owing to the movably arranged sealing element in the tool holder of the tool system. Pressure-tight connections between the surface of the receiving region of the tool holder and the cylindrical outer surface of the sealing element, and between the contact surface of the clamping element and the planar surface of the sealing element result.

If a plurality of fluid channels ends in the region of the interface between the clamping element and the main body, the sealing element may comprise a plurality of openings for connecting the plurality of fluid channels. It is also possible for the connection of individual channels to be established by means of sealing elements that comprise openings at different positions. For example, using a sealing element having an opening at a first position can ensure the connection of a fluid channel at a first position. If said sealing element is replaced by another sealing element that has an opening at a second position, the connection of a channel at a second position can thus be established thereby. If a sealing element is used that has an opening at the first and at the second position, a connection of two channels can be established. Of course, this requires at least two channels or fluid channels to be provided both in the tool holder and in the clamping element.

The number of surfaces of the sealing means may be larger than the number of contact surfaces of the clamping element. This means that, in the clamped state of the tool system, the contact surface of the clamping element is arranged entirely within the surface of the sealing means. The surface of the sealing means then protrudes beyond the contact surface of the clamping element over the entire periphery thereof. It is possible in addition for the contact surface of the sealing means to be arranged so as to be spaced apart from the contact surface of the tool holder in the clamped state of the tool system. In this case, said spacing may be from a few hundredths of a millimeter to approximately 1.5 mm.

A common feature of the sealing elements used is that the movable arrangement thereof makes it possible for the interface between the clamping element and the main body of the tool system to be formed so as to be fluid-tight. The sealing element may be formed of a metal material or of ceramic or of another suitable, non-resilient, material. In this context, a metal is considered to be non-resilient.

According to the invention, a tool system comprising an interface that has contact surfaces and a sealing element is proposed. The sealing element interconnects line portions of a fluid system between a tool holder and a clamping element in a fluid-tight manner. The sealing element may be arranged in or on the tool holder, or alternatively on or in the clamping element.

The invention relates to a tool system comprising a tool holder that has an insert seat for receiving a cutting insert, and comprising a clamping element that has an opening for receiving a clamping means, an interface being arranged between the tool holder and the clamping element, and channels for the purpose of cooling by means of a fluid being arranged in the tool holder and in the clamping element, and a sealing means being arranged in the region of the interface.

| List of reference signs | |
|---|---|
| 1 | tool system |
| 2 | tool holder |
| 4 | clamping element |
| 5 | attachment, projection, nose of 4 |
| 6 | cutting insert |
| 7 | depression of 6 |
| 10 | upper face of 6 |
| 15 | clamping means |
| 17 | insert seat |
| 18 | first end of 4 |
| 19 | second end of 4 |
| 20 | contact surface of 4 |
| 21, 21' | flat face of 4 |
| 22 | contact surface of 2 |
| 23 | fastening portion of 15 |
| 24 | clamping portion of 15 |
| 25 | guide portion of 15 |
| 26 | opening, bore |
| 27 | stop, wall of 26 |
| 28 | contact surface of 4, stop means |
| 30, 30' | interface |
| 31 | element, sealing element, sealing means |
| 32 | sealing surface, surface |
| 33, 34 | narrow flat face of 4 |
| 36 | lateral surface |
| 38 | channel system |
| 39, 40, 41 | line portion of 2 |
| 42 | line portion of 4 |
| 43 | means for connecting channels |
| 44 | longitudinal direction, horizontal mobility |
| 45 | entrance of 38 |
| 46 | exit |
| 47 | exit |
| 48 | surface of 2 |
| 49 | coupling |
| 50 | opening |
| 51 | recess |
| 52 | fastening means |
| 53 | longitudinal axis of 31 |
| 54 | movement direction |
| 56 | end caps |
| 57 | fastening portion of 52 |
| 58 | guide portion of 52 |
| 59 | groove of 4 |
| 60 | contact surface |
| 61 | pressure plate |
| 63 | recess |
| H | height of 31 |
| D | diameter of 31 |
| γ | angle |
| α | angle |

BRIEF DESCRIPTION OF THE DRAWINGS

The invention will be described in the following with reference to figures, in which.

All the figures show partial, schematic views of the invention, and are consulted by way of example in order to explain the invention. Specific embodiments of the invention may differ from these figures.

DETAILED DESCRIPTION

Figure 1:
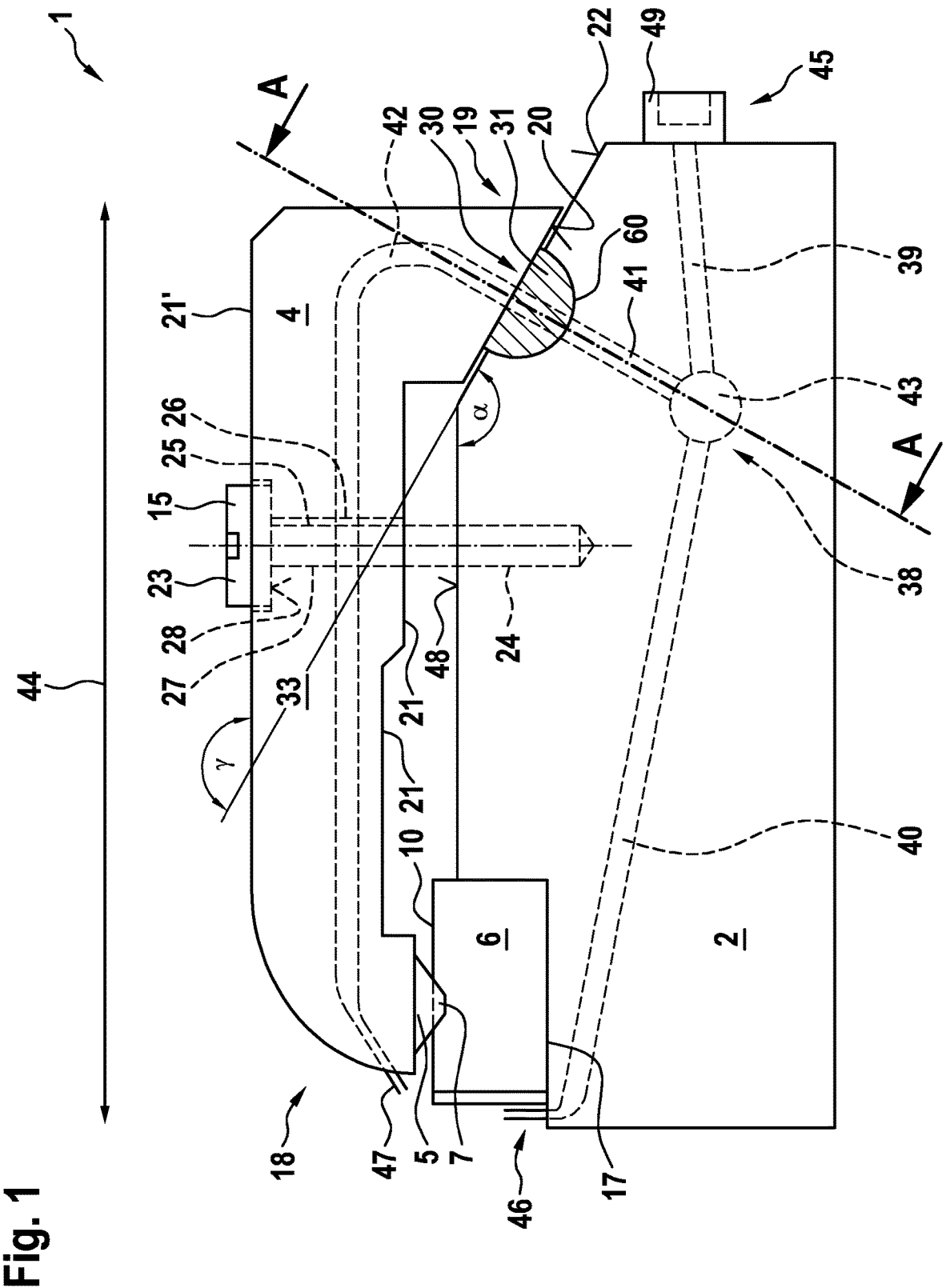
FIG. 1: is a partial, schematic, cross-sectional view of the tool system, comprising a tool holder, a cutting insert, a clamping element and a sealing element.

FIG. 1 is a schematic view of a tool system 1 comprising a tool holder 2, a cutting insert 6 which comprises a depression 7 on the upper face 10 thereof, and a clamping element 4 that has a nose 5 which engages in the depression 7 of the cutting insert 6 when the tool system 1 is in the clamped state. The clamping element 4, which substantially corresponds to the shape of a square, comprising two broad flat faces 21, 21' and two narrow flat faces 33, 34, is fastened to the tool holder 2 by a clamping means 15. The cutting insert 6 is preferably also designed as what is known as a replaceable cutting insert and, during use, can be positioned in the insert seat 17 of the tool holder 2 so as to be rotated by 180 degrees. The nose 5 is arranged at the first end 18 of the clamping element 4. At the second end 19 thereof, the clamping element 4 comprises a surface 20 that is arranged at an angle. Said surface 20 preferably forms an obtuse angle γ in the range of from 120 to 170 degrees, particularly preferably from 145 to 165 degrees, with the flat face 21' of the upper face of the clamping element 4.

In the region of the surface 20 of the clamping element 4, the tool holder 2 comprises a surface 22 that is congruent to the surface 20. The surface 22 is arranged so as to be at an angle α to the surface 48 of the tool holder 2. If the surfaces 21' and 48 are arranged so as to be mutually parallel, the magnitude of both the angles α and γ is identical, i.e. said angles are the same size. The surfaces 20 and 22 form an inclined plane. The tool holder 2 is retained in the tool system in a fixed position. During the process of fastening the clamping element 4 to the tool holder 2, i.e. when generating a torque when rotating (tightening) the clamping means 15, the surface 20 of the clamping element 4 can slide on the surface 22 of the tool holder 2 (towards the right and downwards in FIG. 1). This clamping mechanism causes the clamping element 4 to move relative to the tool holder 2 and pulls and clamps the cutting insert 6 in the insert seat 17 via the connection between the projection 5 and the depression 7 of said cutting insert. The surface quality of the surfaces 20 and 22 is such that sliding of said surfaces on one another is assisted. The surfaces 20 and 22, also referred to as contact surfaces, form an interface 30 between the clamping element 4 and the tool holder 2.

In the embodiment according to FIG. 1, the clamping means 15 is formed as a screw, also referred to as a tensioning screw. The screw 15 comprises a fastening portion 23, in the form of a head, and a substantially cylindrical clamping 24 and guide portion 25. The clamping portion 24 may be designed as a thread, for example as an external thread, which cooperates with a mating part in the tool holder 2, for example an internal thread or a fastening means. The guide portion 25 of the screw 15 may function as a stop for limiting the linear mobility, in FIG. 1 the horizontal mobility 44, of the clamping element 4. Said mobility is limited by the cooperation between the guide portion 25 of the screw 15 and the stop, i.e. the wall 27 of the opening 26 of the clamping element 4, through which the screw 15 engages in order to fasten the clamping element 4 to the tool holder 2. This limitation prevents the cutting insert 6 from being damaged by too high a torque during the clamping process. The opening 26 in the clamping element 4 may be formed as a circular bore for example. Other shapes of said opening 26, for example slot-like or oval openings, are also possible. All shapes of the opening 26 comprise a stop means 28 and a wall 27. The stop means 28 may be designed in the form of a contact surface, and cooperates with the fastening means 23 of the screw 15. The wall 27 of the opening 26 cooperates with the guide portion 25 of the clamping means 15. The clearance that exists between the external thread of the clamping portion 24 and the internal thread of the tool holder 2 can be used for compensating manufacturing tolerances. Said clearance preferably allows for a movement of the clamping element 4, relative to the tool holder 2, in the range of from 0.1 mm to 0.2 mm, in all directions.

Figure 4:
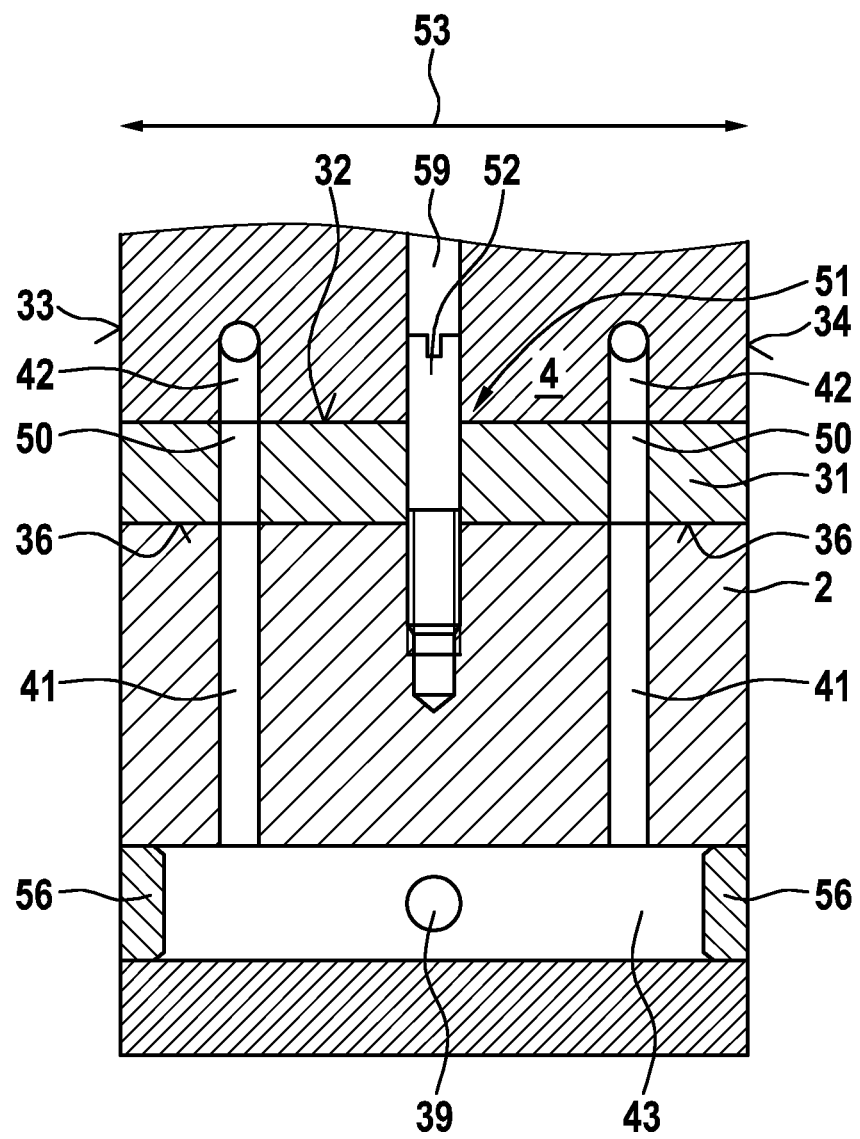

FIG. 1 shows a channel system 38 by way of example, which system extends through the tool holder 2 and the clamping element 4. The channel system 38 comprises line portions 39, 40, 41 that are arranged in the tool holder 2, and line portions 42 that are arranged in the clamping element 4. Said line portions 41, 39 and 40 are connected via a centerpoint 43. Said connecting centerpoint 43 may be an opening, in the form of a bore, that is arranged so as to be transverse to the longitudinal direction 44 of the fluid system and that is closed in a pressure-tight manner at the two openings thereof by sealing means, which are known per se, in the form of end caps 56 (FIG. 4).

As can be seen from FIG. 1, the centerpoint 43 connects three (3) line portions 39, 40, 41. It is also possible to interconnect more than three line portions via one centerpoint 43. Depending on the field of application, different numbers of line portions (2 to 10, or more than 10) may be required. All the line portions present in the tool holder 2 can be interconnected via one or more centerpoints 43. In a particular embodiment, the clamping element 4 may also comprise a plurality of line portions 42. Said plurality of line portions 42 may be arranged in the clamping element 4 so as to be mutually separate, or may also be interconnected via centerpoints similar to the centerpoint 34.

The channel system 38 extends from an entrance 45 to the exits 46 and 47. At the entrance 45 thereof, the channel system 38 may be connected to one or more couplings 49 that are known per se and comprise a pressure conveying means (not shown) which can generate pressure of up to 120 bar. The centerpoint 43 may be arranged in the tool holder, between the entrance 45 and the exit 46. A sealing element 31 according to the invention is arranged in the clamping element, at the interface 30, between the entrance 45 and the exit 47. Said sealing element 31 can establish a fluid-tight connection between the line portion 41 in the tool holder 2, which ends at a contact surface 60, and the line portion 42 in the clamping element 4.

Figure 2:
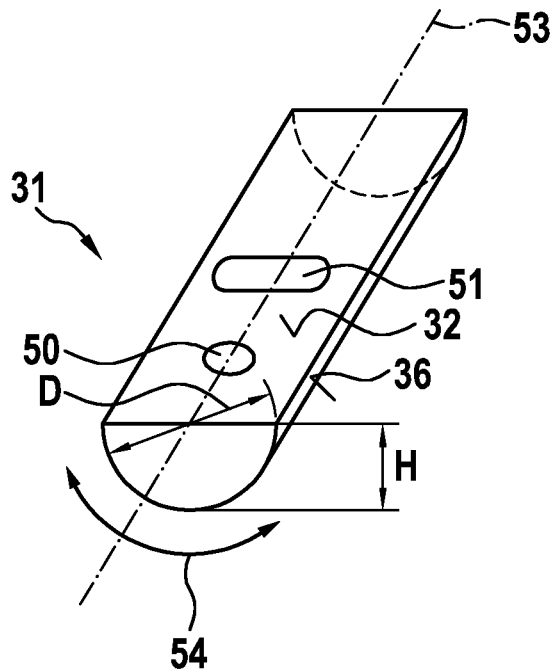
FIG. 2: is a schematic view of a sealing element according to FIG. 1, FIG. 3: is a schematic view of another embodiment of a sealing element according to FIG. 1, FIG. 4: is a section A-A through the tool holder according to FIG. 1 and the sealing element according to FIG. 3, FIG. 5: shows a fastening means.

FIG. 2 is a perspective, schematic view of the sealing element 31. The sealing element 31 consists of metal and comprises a cylindrical lateral surface 36 and a sealing surface 32. The sealing element 31 may also be formed of any other material, such as ceramic, hard metal, or plastics material. The plastics material should not be resilient, however. In the embodiment, the cylindrical lateral surface 36 is in the shape of a semicircle and is delimited at the end faces by termination surfaces that are arranged transversely to the longitudinal axis 53 of the sealing element 31. The shape of the sealing element 31 substantially corresponds to a flattened cylindrical body, i.e. a cylinder that comprises a surface 32. The surface 32 may be arranged along the central axis of the cylinder. In the embodiment according to FIG. 2, the cross-sectional area corresponds to a semicircle. The surface 32 may also be arranged below or above the central axis. If the surface is arranged below the central axis, the height H of the sealing element may be in the range of from ⅕ to ½ of the diameter D, preferably ⅓. In a preferred embodiment, the surface 32 is arranged above the central axis of the sealing element 31. In this case, the height H of the sealing element 31 is in a range of from ½ to ⅘ of the diameter D, preferably ⅗.

The sealing element 31 is captively arranged in the tool holder 2 transversely to the longitudinal axis 53 thereof when the surface 32 of the sealing element is arranged above the central axis of the sealing element and the sealing element 31 is movably retained in a cylindrical recess in the tool holder 2. In this case, it is necessary for the central axis of the cylindrical recess in which the sealing element 31 is mounted to be arranged so as to be at a spacing from the surface 22. The central axis of the cylindrical recess is preferably arranged inside the tool holder 2. In this embodiment (not shown), the sealing element can be introduced into the tool holder 2 exclusively in the longitudinal direction 53, into the opening in the contact surface 60. Owing to the arrangement of the opening (central axis inside the tool holder), the sealing element 31 is captively arranged transversely to the longitudinal axis 53. The sealing element 31 is captively retained by the fastening means 52 (FIG. 4) in the longitudinal direction.

The sealing element 31 according to FIG. 2 comprises a recess 51, for example in the form of a slot. The recess 51 extends from the sealing surface 32 to the lateral surface 36, through the sealing element. The recess is a continuous recess. The width of the recess 51 measured in the longitudinal direction 53 of the sealing element 31 is smaller than the width measured in the transverse direction of the sealing element 31. The width of the recess 51 measured in the longitudinal direction 53 of the pressure element 31 is referred to as the breadth, and the width of the recess 51 measured in the transverse direction of the pressure element 31 is referred to as the length of the recess 51. The sealing element can be fixed in tool holder 2 in the transverse direction by a fastening means 52 (FIG. 4) that is arranged in the recess 51 of the sealing element 31. The fastening means 52 is arranged in the tool holder 2 in a fixed position. According to the invention, the sealing element 31 is arranged in a gimballed and radially movable manner. The mobility of the sealing element 31 is indicated by the arrow 54 in FIG. 2. The radially movably arranged sealing element 31 can be oriented and aligned during the process of clamping the cutting insert 6, the sealing surface 32 of the sealing element 31 adjusting to the surface 20 of the clamping element 4.

The sealing element 31 contains an opening 50 that is arranged so as to be spaced apart from the recess 51. The opening 50 extends from the surface 32 to the lateral surface 36, through the sealing element 31. In the region of the surface 32, the cross section of the opening 50 may have the same cross section as the line portion 42 of the clamping element 4 in the region of the surface 20. The cross section of the opening 50 in the region of the lateral surface 36 may have the same cross section as the line portion 41 in the region of the surface contact surface 36 in the tool holder 2.

Figure 3:
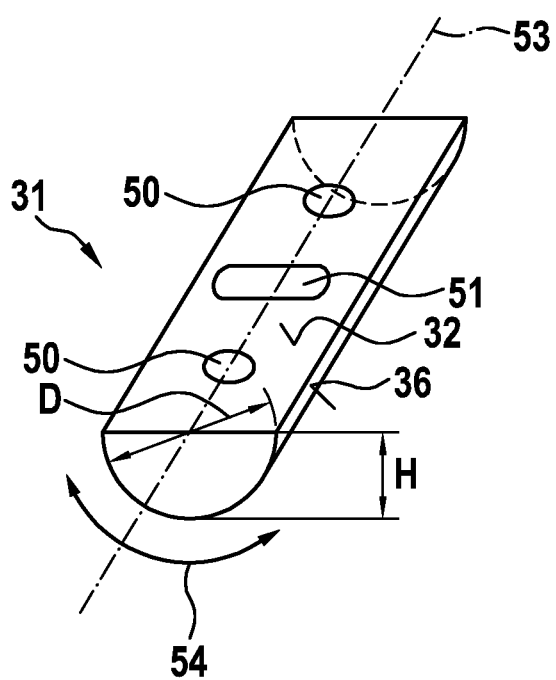

FIG. 3 shows another embodiment of the sealing element 31. Said sealing element comprises two openings 50. This makes it possible to connect two fluid channels 41 in the tool holder 2 to two fluid channels 42 in the clamping element 4, by means of the sealing element 31. Otherwise, the same reference signs and the above description apply accordingly for the same features.

FIG. 4 shows the movable arrangement of the sealing element 31 in the tool holder 2 and the connection of the line portions 39 and 41 to the centerpoint 43. The centerpoint 43 may be an opening, for example a bore, that is arranged so as to be in parallel with the longitudinal axis 53 of the sealing element 31. Said opening 43 is closed in a pressure-tight manner at the two ends thereof by end caps 56. The line portions 39, 40 (not shown) and 41 are connected to the centerpoint 43. A fluid, which is introduced into the tool holder via the line portion 39 for example, divides in the centerpoint 43 and flows to the destination thereof via the line portions 41, 40.

Figure 5:
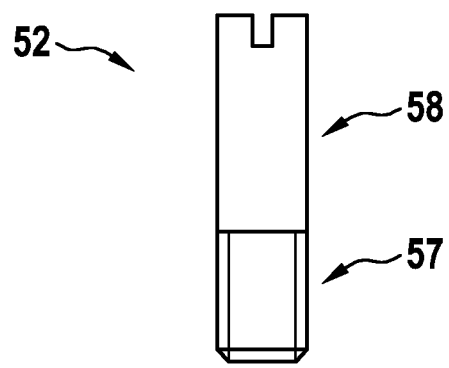

The sealing means 31 is arranged in the tool holder 2 by the fastening means 52, for example a set screw. The fastening means 52 comprises a plurality of regions (FIG. 5). Interlocking means, for example a thread, may be arranged in a fastening portion 57. Guide means, for example in the form of a spring or a pin, may be arranged in a guide portion 58. The tool holder 2 comprises a region in which the fastening means 52 is interlocking fastened, for example screwed. For this purpose, the fastening portion 57 of the fastening means 52 engages completely in the tool holder 2. The guide portion 58 of the fastening means 52, which comprises a pin-like cylindrical portion, forms a locking means together with the breadth of the recess 51 of the sealing element 31. As a result, the sealing element 31 is fixed in the direction of the longitudinal axis 53 of the sealing element 31. The length of the recess 51 is greater than the diameter of the guide portion 58 of the fastening means 52. As a result, the sealing means 31 is mounted so as to be movable transversely to the longitudinal axis 53. Tolerances that result during manufacture of the tool system can be compensated thereby. The movably arranged sealing means 31 makes it possible for the sealing surface 32 to adjust to the position of the surface 20 of the clamping element 4. The process of clamping the clamping element 4 using the clamping means 15 results in a pressure-tight interface, i.e. the line portion 41 continues from the tool holder 2 into the line portion 42 in the clamping element 4, via the sealing means 31, while keeping the same shape.

The guide portion 58 of the fastening means 52 protrudes beyond the sealing means 31 and engages in a groove 59 of the clamping element 4. Together with the groove of the clamping element 4, the guide portion 58 of the fastening means 52 forms a locking means. This ensures that the clamping element 4 is fixed in a precisely positioned manner in the region of the second end 19. A fluid-tight interface between the sealing means 31 and the clamping element 4 can thus be ensured. The line portion 41 of the tool holder 2 transitions into the line portion 42 of the clamping element 2 in a fluid-tight manner, by means of the sealing means 31.

According to the invention, the surface 20 of the clamping element 4, as well as the lateral surface 36, and the surface 32 of the sealing element have a mean roughness Ra of at most 1.6 μm, and an average roughness depth Rz of 6.3 μm. This is in the quality range for sealing surfaces. This allows for a fluid-tight connection.

The tool system 1 may consist of elements 2, 4, 31, 15 that are produced from a solid material, for example. It is also possible to manufacture some of said elements, for example the clamping element 4, by means of additive manufacturing processes. This makes it possible for the position, the direction, the guidance and the cross section of the line portions 42 to be arranged in almost any desired manner and to be adjusted to the process conditions.

In another embodiment (not shown), the tool system additionally comprises a support plate which is arranged on the tool holder below the cutting insert. Said support plate may also contain fluid channels via which the cooling medium is conveyed to its destination. The support plate can be produced in an additive or another type of manufacturing process, for example a sintering process. Said plate may be formed of metal, hard metal, or ceramic.

In an embodiment of the tool system 1 according to the invention, the sealing surface 32 of the sealing element 31 may be arranged so as to be spaced apart from the contact surface 22 of the tool holder 2. In this case, the spacing between the contact surface 22 and the sealing surface 32 is positive (see FIGS. 1 and 6). In this embodiment, during the clamping process the clamping element 4 moves towards the tool holder 2, the contact surface 20 sliding from the clamping element 4 onto the sealing surface 32 of the sealing element 31. The movement of the clamping element 4 in the longitudinal direction 44 is limited by the stop 27 of the opening 26 when the guide portion 25 of the clamping means 15 is in contact with said stop. The spacing between the wall 27 and the outlets of the line portions 41, 42 and openings 50 is dimensioned such that, in the clamped state, the central axes of the line portions 41, 42 and of the openings 50 of the sealing means 31 are arranged so as to be mutually concentric. This, in conjunction with the movable mounting of the sealing means 31, ensures fluid-tight transfer of a medium.

Figure 6:
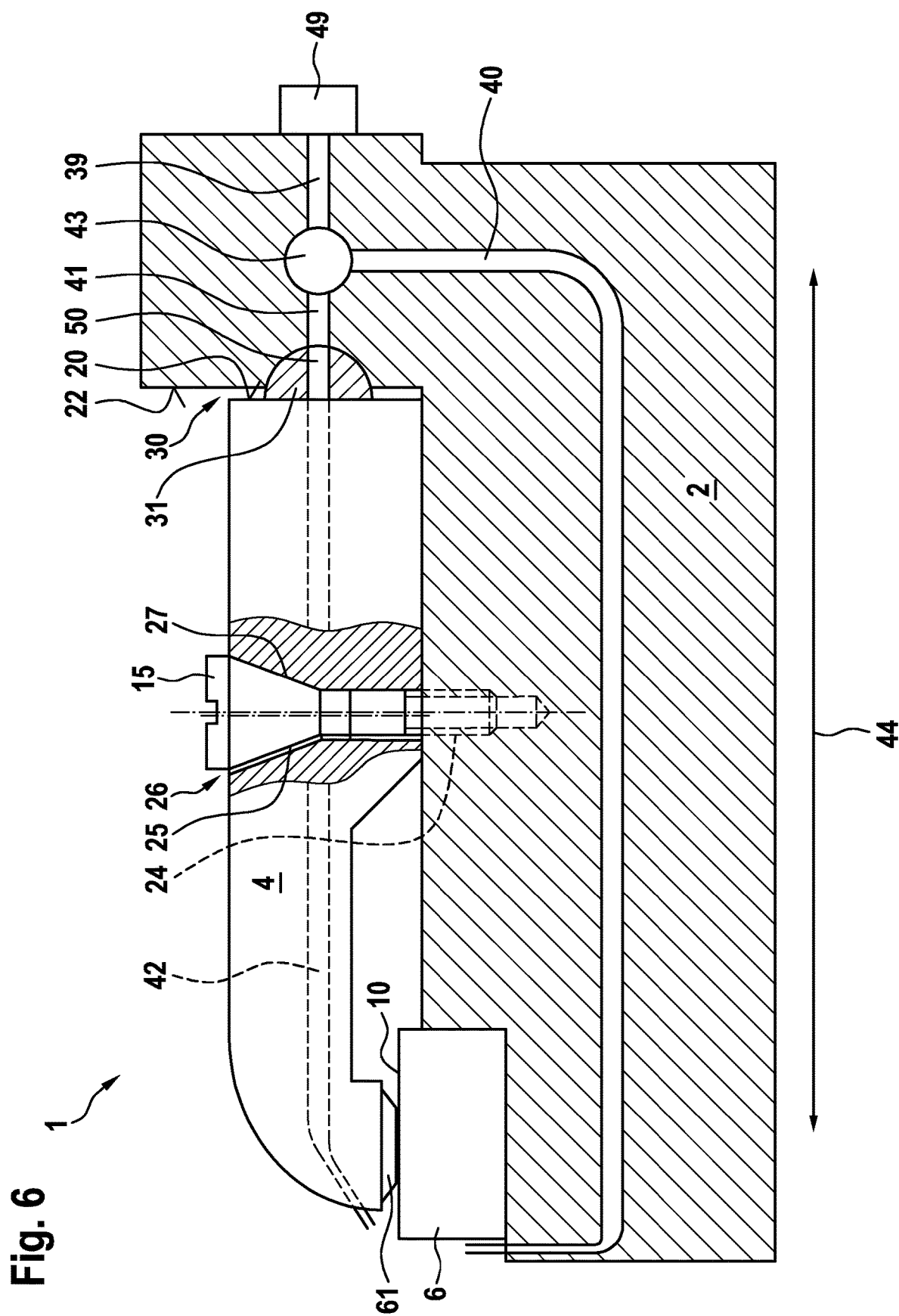
FIG. 6: is a cross-sectional view of an alternative embodiment of a tool system.

FIG. 6 shows another embodiment of a tool system 1 according to the invention. The interface 30 is again formed by the contact surface 20 of the clamping element 4 and the contact surface 22 of the tool holder 2. The contact surfaces 20 and 22 are arranged transversely, for example at an angle of 90 degrees, to the longitudinal direction 44. The sealing element 31 that ensures arranged fluid-tight connection between the line portion 41 and the line portion 42 is arranged in the region of the interface 30. According to the embodiment according to FIG. 6, during the clamping process the relative movement of the clamping element 4 is achieved by means of a conical guide portion 25 of the clamping means 15, in cooperation with a conical stop 27 of the opening 26 of the clamping element 4. In this case, it is necessary for the spacing between the central axis of the conical stop 27 of the opening 26 in the clamping element 4, and the sealing means 31, to be larger, in this embodiment, than the spacing between the central axis of the fastening means (for example the internal thread) in the tool holder 2 in which the clamping portion 24 of the clamping means 15 is fastened. In this case, the center line or central axis of the opening 26 in the clamping element 4 is at a smaller spacing from the cutting insert 6 than the center line of the fastening means in the tool holder 2 (FIG. 6). In the embodiment according to FIG. 6, the cutting insert 6 comprises a flat upper face 10 without a depression. The process of fastening the cutting insert 6 by means of the clamping element 4 is achieved by means of a pressure plate 61 which is movably retained on the clamping element 4. The pressure plate 61 comprises a smooth clamping surface that is arranged opposite the upper face 10.

Figure 7:
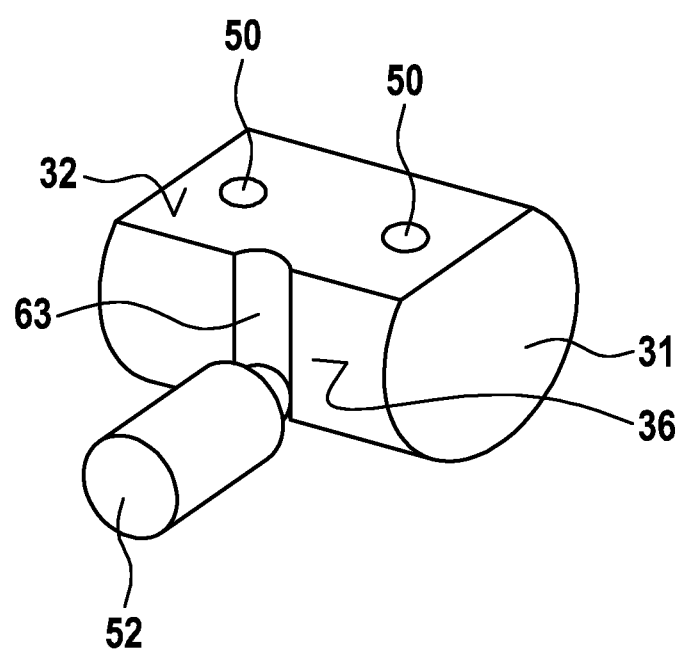
FIG. 7: shows an alternative embodiment of a sealing element.

FIG. 7 shows a sealing element 31 that has a reduced extension in the longitudinal direction. Said shorter length allows only for openings 50 for connecting the line portions 41, 42 of the fluid channels. A recess as described above, in the form of a slot, for captively arranging the sealing means is not possible. As a result, the sealing element 31 comprises a recess 63 in the form of a rounded furrow on the lateral surface thereof. A catch, for example a ball of a fastening means 52, also known as a resilient pressure piece, engages in said furrow 63. The fastening means 52 is retained in a fixed position. If the sealing element 31 is arranged in or on the tool holder 2, the fastening means 52 is fastened in the tool holder 2. If the sealing element 31 is arranged on or in the clamping element 4, the fastening means 52 is fastened in the clamping element 4. Otherwise, the same reference signs and the above description apply accordingly for the same features.

The embodiments according to FIG. 1 and FIG. 6 differ in that the interface 30 is arranged at a different position, the relative movement of the clamping element 4 is achieved by means that are arranged outside the interface, and a cutting insert having a smooth surface is used. Otherwise, the same reference signs and the above description apply accordingly for the same features.

Embodiments are also possible which comprise different combinations of the above possible embodiments (position and design of the interface, implementation of the relative mobility of the clamping element, cutting insert comprising or without a depression).

Tool system 1 comprising a tool holder 2 that has an insert seat 17 for receiving a cutting insert 6, and comprising a clamping element 4 that has an opening 26 for receiving a clamping means 15, an interface 30 being arranged between the tool holder 2 and the clamping element 4, and channels for the purpose of cooling by means of a fluid being arranged in the tool holder 2 and the clamping element 4, and a sealing means 31 being arranged in the region of the interface 30.

The invention claimed is:

1. A tool system comprising:
a tool holder that has an insert seat configured to receive a cutting insert, and a tool holder contact surface remote from the insert seat, the tool holder further comprising a tool holder line portion,
a clamping element that has an opening, comprising a stop, for receiving a clamping means, and a substantially planar clamping element contact surface, the tool holder contact surface and the clamping element contact surface forming an interface between the tool holder and the clamping element, the clamping element comprising a clamping element line portion, and
a sealing means is provided at the interface between the tool holder and the clamping element and is fastened by a fastening means, wherein a material of the sealing means at least in a sealing area at the interface between the tool holder contact surface and the clamping element contact surface is not resilient.

2. The tool system according to claim 1, wherein the sealing means is arranged in the tool holder by the fastening means.

3. The tool system according to claim 1, wherein the sealing means is captively retained in a direction of a longitudinal axis of the sealing means.

4. Tool system according to claim 1, wherein the sealing means comprises a cylindrical lateral surface and a sealing surface is arranged so as to be movable around a longitudinal axis of the sealing means.

5. The tool system according to claim 1, wherein the sealing means comprises at least one opening configured to connect the tool holder line portion to the clamping element line portion when the tool system is in a clamped state.

6. The tool system according to claim 5, wherein a connection between the tool holder line portion and the clamping element line portion is a fluid-tight connection.

7. The tool system according to claim 1, wherein the sealing means is produced from metal.

8. The tool system according to claim 1, wherein the sealing means is produced from ceramic.

9. The tool system according to claim 1, wherein the clamping element is produced by an additive manufacturing process.

10. The tool system according to claim 1, wherein the clamping element comprises a flat face and the tool holder comprises a surface, and the interface is arranged so as to be at an angle $(\gamma,\alpha)$ relative to the flat face and to the surface.

11. A tool system comprising:
a tool holder that has an insert seat configured to receive a cutting insert, and a tool holder contact surface remote from the insert seat, the tool holder further comprising a tool holder line portion,
a clamping element that has an opening, comprising a stop, for receiving a clamping means, and a clamping element contact surface, the tool holder contact surface and the clamping element contact surface forming an interface between the tool holder and the clamping element, the clamping element comprising a clamping element line portion, wherein the clamping element comprises a nose having an annular surface, and the cutting insert comprises a depression having an annular surface, the nose of the clamping element engaging in the depression of the cutting insert, and the cutting insert thereby being clamped in the insert seat of the tool holder, when the tool system is in a clamped state, and
a sealing means is provided at the interface between the tool holder and the clamping element and is fastened by a fastening means, wherein a material of the sealing means is not resilient.

12. The tool system according to claim 11, wherein in the clamped state a force is introduced by the clamping means, via the clamping element and the nose and the annular surface of the nose, to an annular surface of the depression.

13. The tool system according to claim 12, wherein in the clamped state a force is introduced to the annular surface of the depression via a region of 360° of the annular surface of the nose of the clamping element.

14. The tool system according to claim 1, wherein the sealing means is arranged in the clamping element by the fastening means.

15. The tool system according to claim 4, wherein the sealing means is captively retained in a direction of a longitudinal axis of the sealing means.

16. The tool system according to claim 15, wherein the fastening means is a set screw.

17. The tool system according to claim 1, wherein the fastening means is a set screw.

* * * * *